United States Patent Office 2,937,970
Patented May 24, 1960

2,937,970
ORGANIC ISOTHIOCYANATE FUNGICIDES

Herbert Aubrey Stevenson, John Ray Marshall, and Anthony Frederick Hams, all of Nottingham, England, assignors to Boots Pure Drug Company Limited, Nottingham, England, a British company No Drawing. Filed Feb. 4, 1957, Ser. No. 637,865

Claims priority, application Great Britain Feb. 24, 1956

15 Claims. (Cl. 167—30)

This invention relates to the discovery of unexpected valuable properties in certain organic isothiocyanates and to new fungicidal compositions containing these compounds as active ingredient.

The invention consists in compositions for use in horticulture which contain as active ingredient a compound having the general formula:

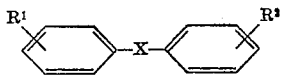

I in which $R^1$ and $R^2$ each represent a p-isothiocyanato radical and X represents an —SO— or an —SO$_2$— group or $R^1$ represents p-chlorine, $R^2$ represents a p-isothiocyanato radical and X represents an —SO$_2$— group or $R^1$ and $R^2$ each represent a m-isothiocyanato radical and X represents an —SO$_2$— group.

Certain of the compounds falling within the above general Formula I are new and these new compounds are di-4-isothiocyanatophenyl sulphoxide, 4-chlorophenyl 4-isothiocyanatophenyl sulphone and di-3-isothiocyanatophenyl sulphone.

We have now found that dusts, dispersions, emulsions, smokes and aerosols of the compounds of the above general Formula I have properties which render them valuable for the control of fungi for example *Venturia inaequalis, Botrytis cinerea, Sclerotinia fructigena, Tilletia caries, Pythium debaryanum, Corticium solani, Podosphaera leucotricha* and *Cladosporium fulvum*.

Our invention consists therefore in the new compounds di-4-isothiocyanatophenyl sulphoxide, 4-chlorophenyl 4-isothiocyanatophenyl sulphone and di-3-isothiocyanatophenyl sulphone and in compositions which contain as active ingredient a compound of the above general Formula I together with a diluent or carrier.

The active compounds of the invention may be prepared by methods which are well known in the art for the synthesis of organic isothiocyanates. Thus these compounds may be prepared by the action of thiophosgene on the corresponding amines of the general formula:

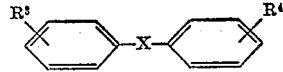

II in which $R^3$ and $R^4$ each represent a p-amino radical and X represents an —SO— or an —SO$_2$—group, or $R^3$ represents p-chlorine, $R^4$ represents a p-amino radical and X represents an —SO$_2$— group or $R^3$ and $R^4$ each represent a m-amino radical and X represents an —SO$_2$— group. The thiophosgene may be used as such or prepared in situ preferably by reduction of trichloromethane sulphenyl chloride with stannous chloride as described by Connolly and Dyson (J.C.S., 1935, p. 679).

The dispersions having a solid dispersed phase according to the invention may comprise the active ingredient in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water-miscible organic solvent, for example, acetone. The dispersions according to the invention also include suspensions in which the solid dispersed phase is admixed with an aqueous oil emulsion, the active ingredient being substantially insoluble in the oil thereof, which oil is preferably a non-volatile oil, for example, liquid paraffin. In such compositions the diluent or carrier comprises a dispersing and/or suspending agent, an emulsifying agent and a non-volatile oil.

The emulsions according to the invention may comprise the active ingredient in combination with an emulsifying agent and organic solvent, for example, xylene or an aromatic solvent boiling within the range 80–300° C. It may be advantageous to add a non-volatile vegetable or mineral oil such as liquid paraffin to act as an activator and/or sticker. The emulsion composition according to the invention may also contain a wetting agent. For convenience the composition may consist of the active ingredient admixed with or in solution in an organic solvent as hereinbefore specified together with an emulsifying agent, and if desired, a wetting agent such that an emulsion is formed on admixing the composition with water. Such compositions also form part of the present invention. The aqueous dispersions and emulsions herein described may be diluted with water before application to obtain a final concentration of the active ingredient within the range 0.001–10% w./v. but the invention is not limited to compositions which contain this concentration of the active ingredient; the concentration of the solutions which are employed depends upon the requirements of the particular spraying machine which is to be used.

Dispersions of the active ingredient in which the carrier is a pulverulent solid diluent also form part of the present invention. Such dispersions may contain up to 50% w./v. of the active ingredient.

We have found that it is possible to employ a compound having the above general Formula I in the form of smokes and aerosols. This method of application is very convenient when the plants, which it is desired to treat for the control of the fungi, are located in an enclosed area, for example, in a greenhouse.

Accordingly our invention also comprises compositions for the preparation of fungicidal smokes and aerosols which contain as active ingredient a compound of the general Formula I.

In the preparation of compositions suitable for dispersion as aerosols which contain as active ingredient compounds of the above general Formula I, the active ingredient may be dissolved in a volatile solvent such as acetone. Alternatively the active ingredient may be dissolved in a high boiling aromatic solvent such as xylene or a non-volatile oil such as vegetable oil together with a supplementary solvent such as cyclohexanone or acetone if desired. Such compositions are readily dispersed as aerosols either by mechanical means or by incorporating therein a volatile propellant such as Freon (a mixture of chlorofluoro derivatives of methane and ethane).

Compositions suitable for the generation of fungicidal smokes comprise the active ingredient in association with an ignitible slow burning composition such that a smoke containing the active ingredient is generated on ignition.

The wetting and emulsifying agents which are employed in the compositions of the invention should preferably be free of amino groups and alcoholic groups so as to avoid the possibility of condensation taking place between the active ingredient and one of the aforementioned groups with the formation of thioureas and thiourethanes respectively.

In the case of compositions which are to be subjected to prolonged storage and which contain a compound having the above general Formula I dissolved in an organic solvent the latter should preferably be substantially anhydrous as the presence of water in such solutions tends to cause hydrolysis of the active ingredient on storage.

Other insecticides and fungicides such as D.D.T. benzene hexachloride and sulphur may be incorporated in the compositions of the invention before application of the latter to the plants.

Compounds having the above general Formula I have been demonstrated to possess fungicidal activity in tests carried out in the following manner.

LABORATORY TEST (1) *Spore germanination test.*—The test is based on the recommendations of the American Phytopathological Committee (1943). On a glass slide a deposit of known weight of the compound under test is formed by allowing an acetone solution of known concentration of the compound to evaporate. Spores of one of a number of pathogenic fungi in aqueous suspension are set on these deposits to germinate and the percentage germination is noted. In Table I the results of these tests are shown, the "approximate L.D. 50" being the concentration in parts per million of the acetone solution of the substance under test which it is calculated would inhibit 50% of the spores from germinating; the higher the value of the L.D. 50 the lower the activity of the compound. The figures shown in the column headed "Derived L.D. 50" are obtained by suspending spores in a series of solutions of graded dilution of the substance under test and assessing the concentration causing 50% inhibition of germination. The test solutions are prepared by dilution with water of a 5% w./v. solution of the substance in acetone. In Table I the symbols B.C., S.F., C.F. and V.I. represent the fungi *Botrytis cinerea, Sclerotinia fructigena, Cladosporium fulvum* and *Venturia inaequalis* respectively.

*Table I*

| Compound | Approximate L.D. 50 | | | | Derived L.D. 50 | | |
|---|---|---|---|---|---|---|---|
| | B.C. | S.F. | C.F. | V.I. | V.I. | C.F. | S.F. |
| Di-4-isothiocyanato-phenyl sulphone | 300 | 12 | 6 | <1 | 0.09 | | |
| 4-chlorophenyl-4-isothiocyanatophenyl sulphone | 400 | 80 | 2 | <1 | 0.14 | | |
| Di-3-isothiocyanato-phenyl sulphone | 3 | <2 | 12 | <1 | 0.20 | | |
| Di-4-isothiocyanato-phenyl sulphoxide | <1 | <1 | <1 | <1 | 0.19 | 0.05 | 0.11 |

(2) *Bunt of wheat test.*—A number of the compounds of the invention have been tested in the following manner. Seeds of wheat are infected with *Tilletia caries* and dressed with dusts containing 10% w./v. of the substance under test in kaolin at the rate of 2 ozs. of dust per bushel of seed. The dressed seeds are incubated for 5 days on agar and at the end of this time the seeds are removed from the agar and the spores of the fungus remaining on the agar surface are examined for germination. The results obtained in this test are shown in Table II.

*Table II*

| Compound | Bunt of Wheat |
|---|---|
| 4-chlorophenyl 4-isothiocyanatophenyl sulphone | C. |
| Di-3-isothiocyanatophenyl sulphone | C. |
| Di-4-isothiocyanatophenyl sulphoxide | C. |

Key: C = complete control.

EXTENSION TESTS

The compounds have been subjected to further tests which are designed to ascertain the activities of the compounds against various fungi living on a plant host.

(1) *Tomato leaf mould (Cladosporium fulvum).*—This test is carried out using young tomato plants growing in pots in a glasshouse. A group of five tomato plants is sprayed to run off with an aqueous suspension containing 0.05% w./v. of the compound under test. When the spray deposit is dry the plants are enclosed in a chamber in a moist atmosphere at a temperature of 75° C. and the plants are inoculated with spores of *Cladosporium fulvum.* A group of untreated plants is inoculated in similar manner. The plants are kept under these conditions for 3 days and are then kept under normal glasshouse conditions for 15–18 days. At the end of this time three leaves are removed from each plant and examined; the number of lesions per leaf is counted. The average number of lesions per leaf in the treated plants is expressed as a percentage of the average number of lesions per leaf in the untreated control plants and this figure is designated "percentage infection."

Substances which show activity in the above spray test are submitted to a further test which employs the active substance in the form of an aerosol. A group of five young tomato plants is placed in a fumigation chamber of a volume of 11 cu. ft. and 0.125 cc. of a 5% w./v. solution in acetone of the substance under test is dispersed into the chamber by means of a paint spray gun. The aerosol cloud is allowed to settle for 3 hours after which the plants are removed from the fumigation chamber, inoculated with spores of *Cladosporium fulvum* and the infection assessed as described above in the spray test. The results obtained in the above two tests are summarised in Table III.

(2) *Groundsel mildew.*—In this test groups of 5 groundsel plants growing in pots in a glasshouse are sprayed to run off with an aqueous suspension containing 0.05% w./v. of the compound under test and as soon as the spray deposit is dry the plants are artificially infected with *Oidium* sp. under similar conditions to those described in the Tomato leaf mould test. The degree of control of the mildew by the treatment is assessed by a visual examination of the plants and the results are expressed in Table III on an arbitrary scale of very good control (VG), good control (G), fair control (F) and poor control (P).

(3) *Apple mildew (Podosphaera leucotricha).*—This test is carried out in a similar manner to that described above for groundsel mildew employing apple seedlings growing in pots in a glasshouse. The results are expressed in Table III in like manner to those obtained in the Groundsel mildew test.

(4) *Apple scab (Venturia inaequalis).*—The activity of the compounds of the invention has been assessed by a small scale field trial carried out as follows. In this trial the trees were two year old Bramleys planted close together in a nursery and randomised blocks each containing four trees were used for each substance under test. The trees were sprayed to run off six times between April and July 1956 with aqueous suspensions containing 0.1% w./v. of active ingredient. An assessment of the effectiveness of the compounds under test was made in the middle of August by collecting 100 leaves from each tree and measuring the percentage area of each infected by the fungus. The results quoted in Table III below are averages of the percentage areas infected on the 400 leaves collected from each block of trees. For the purposes of comparison control blocks of trees which received no treatment were similarly examined, the average degree of infection in the controls being 1.2%.

(5) *Celery leaf spot.*—The activity of some of the compounds against *Septoria apii-graveolentis* on celery plants was determined in a similar manner to that described for the first of the Tomato leaf mould tests. The results are summarised in Table III and expressed in the same manner as those obtained in the Tomato leaf mould tests.

*Table III*

| Compound | Tomato Leaf Mould (percent infection) | | Groundsel Mildew | Apple Mildew | Apple Scab (percent infection) | Celery Leaf Spot (percent infection) |
| --- | --- | --- | --- | --- | --- | --- |
| | Spray | Aerosol | | | | |
| Di-4-isothiocyanato-phenyl sulphone | 3 | 12 | P | | 0.49 | 5.6 |
| 4-Chlorophenyl 4-isothiocyanatophenyl sulphone | 0 | 12 | G | F | 1.39 | |
| Di-3-isothiocyanatophenyl sulphone | 100 | 7 | P | | 0.78 | 3.2 |

The following non-limitative examples illustrate the invention.

EXAMPLE 1

In the preparation of 4-chlorophenyl 4-isothiocyanatophenyl sulphone a mixture of 13.4 grams of 4-aminophenyl 4-chlorophenyl sulphone, 8.4 grams of thiosphosgene and 50 cc. of chloroform is heated under reflux for 20 hours. At the end of this time the solution so obtained is filtered and 1 gram of active alumina and 150 cc. of petroleum ether (boiling range 80–100° C.) are added to the filtrate which is then filtered at the boiling point. The crystalline solid which separates from the filtrate on cooling is isolated by filtration and recrystallised from a mixture of equal volumes of chloroform and petroleum ether (boiling range 80–100° C.). There is thus obtained 4-chlorophenyl 4-isothiocyanatophenyl sulphone in the form of a crystalline solid which has a melting point of 149° C. (Found: C, 50.1; H, 2.5. $C_{13}H_8O_2NClS_2$ requires C, 50.4; H, 2.6%.)

EXAMPLE 2

(a) In the preparation of di-3-isothiocyanatophenyl sulphone a solution of 10.5 cc. of thiophosgene in 100 cc. of chloroform is added to a suspension of 24.8 grams of di-3-aminophenyl sulphone in 50 cc. of 2 N hydrochloric acid with vigorous stirring. Potassium carbonate is added to the mixture with continued stirring until the aqueous layer is permanently neutral. The chloroform layer is separated, dried over anhydrous sodium sulphate and evaporated to dryness. The residue is recrystallised from trichloroethylene. There is thus obtained di-3-isothiocyanatophenyl sulphone in the form of a crystalline solid which has a melting point of 119–122° C. (Found: C, 50.5; H, 2.5. $C_{14}H_8O_2N_2S_3$ requires C, 50.6; H, 2.4%.)

(b) Alternatively di-3-isothiocyanatophenyl sulphone may be prepared in the following manner. To a stirred mixture of 24.8 grams of di-3-aminophenyl sulphone, 100 cc. of alcohol-free chloroform, 67.6 grams of stannous chloride, 40 cc. of concentrated hydrochloric acid and 360 cc. of water there is slowly added 25 cc. of redistilled trichloromethanesulphenyl chloride. The reaction mixture is stirred for 1.5 hours, filtered through kieselguhr and the layers separated. The aqueous layer is washed with 50 cc. of alcohol-free chloroform and the combined chloroform solutions are dried over anhydrous sodium sulphate. The chloroform is removed by distillation under reduced pressure and the residue is slurried with 100 cc. of petroleum ether (boiling range 80–100° C.), isolated by filtration and recrystallised from petroleum ether (boiling range 80–100° C.). There is thus obtained di-3-isothiocyanatophenyl sulphone which is identical with the product obtained in (a) above.

EXAMPLE 3

(a) In the preparation of di-4-isothiocyanatophenyl sulphoxide, a solution of 11.6 grams of di-4-aminophenyl sulphoxide in 50 cc. of 2 N hydrochloric acid is stirred at room temperature with a solution of 9.5 cc. of thiophosgene in 100 cc. of chloroform. An exothermic reaction takes place and 100 cc. of water is added to the reaction mixture to reduce the temperature. After stirring for 50 minutes, the chloroform layer is separated, dried over anhydrous sodium sulphate and evaporated. The crystalline residue is extracted with 200 cc. of boiling petroleum ether (boiling range 100–120° C.) and the solution so obtained is decanted from remaining solid. On cooling to room temperature di-4-isothiocyanatophenyl sulphoxide crystallises and is collected by filtration. This extraction procedure is repeated twice more, using as solvent the mother liquor from the previous crystallisation. There is thus obtained di-4-isothiocyanatophenyl sulphoxide in the form of a crystalline solid which has a melting point of 138–140° C. (Found: C, 53.6; H, 2.7. $C_{14}H_8ON_2S_3$ requires C, 53.2; H, 2.5%.)

(b) Alternatively this compound may be prepared as follows. To a mixture of 11.6 grams of di-4-aminophenyl sulphoxide, 11 cc. of trichloromethanesulphenyl chloride, 50 cc. of alcohol-free chloroform and 50 cc. of 2 N hydrochloric acid, 22.6 grams of stannous chloride is added with stirring. The temperature of the reaction mixture is not allowed to exceed 45° C. The mixture is stirred at room temperature for 1 hour, filtered through kieselguhr and the chloroform and aqueous layers separated. The chloroform layer is dried over anhydrous sodium sulphate and evaporated to dryness under reduced pressure. The residue thus obtained is subjected to a number of extraction and crystallisation procedures in the same manner to that described above. There is thus obtained di-4-isothiocyanatophenyl sulphoxide which is identical with the product described above.

EXAMPLE 4

In the preparation of a dispersible powder, 20 parts by weight of 4-chlorophenyl 4-isothiocyanatophenyl sulphone is intimately mixed with 8 parts by weight of Belloid T.D. (a condensate of formaldehyde and an alkyl aryl sulphonate), 5 parts by weight of Nansa (the sodium salt of an alkyl-arylsulphonic acid) and 67 parts by weight of kaolin. This composition may be added to water to form a dispersion suitable for horticultural use.

EXAMPLE 5

In the preparation of a fungicidal dust, 5 parts by weight of 4-chlorophenyl 4-isothiocyanatophenyl sulphone is intimately mixed with 95 parts by weight of kaolin.

Compositions similar to those described in Examples 4 and 5 may be prepared in which 4-chlorophenyl 4-isothiocyanatophenyl sulphone is replaced by di-3-isothiocyanatophenyl sulphone, di-4-isothiocyanatophenyl sulphoxide or di-4-isothiocyanatophenyl sulphone.

EXAMPLE 6

In the preparation of a composition suitable for dispersion as an aerosol, sufficient di-3-isothiocyanatophenyl sulphone is dissolved in substantially anhydrous acetone to obtain a solution which contains 5% w./v. of active ingredient. This composition is readily dispersed as an aerosol by mechanical means, for example, by the use of a paint spray gun.

EXAMPLE 7

In the preparation of a dispersible powder 10 parts by weight of 4-chlorophenyl 4-isothiocyanatophenyl sulphone is intimately mixed with 8 parts by weight of Belloid T.D. (a condensate of formaldehyde and an alkyl aryl sulphonate) and 82 parts by weight of kaolin. This composition may be added to water to form a dispersion suitable for horticultural use.

In exactly similar manner there may be prepared a composition which contains as active ingredient di-3-isothiocyanatophenyl sulphone.

EXAMPLE 8

In the preparation of a composition suitable for dispersion as an aerosol sufficient 4-chlorophenyl 4-isothiocyanatophenyl sulphone is dissolved in a mixture of 5 parts by volume of arachis oil and 95 parts by volume of substantially anhydrous acetone to obtain a solution which contains 5% w./v. of active ingredient.

This composition is readily dispersed as an aerosol by mechanical means, for example, by the use of a paint spray gun.

Similar compositions may be prepared in which the active ingredient is one of the following compounds:
Di-3-isothiocyanatophenyl sulphone.
Di-4-isothiocyanatophenyl sulphoxide.

EXAMPLE 9

In the preparation of a composition which is suitable for dilution with water to produce a dispersion 10 parts by weight of 4-chlorophenyl 4-isothiocyanatophenyl sulphone is dissolved in sufficient acetone containing 1% v./v. of Ethylan CP (a polyethylene oxide condensate of octylphenol) to obtain a solution which contains 10% w./v. of active ingredient.

EXAMPLE 10

In the preparation of a composition which is suitable for dilution with water to produce a stable emulsion sufficient di-3-isothiocyanatophenyl sulphone is dissolved in a mixture of 10 parts by volume of Ethylan SE (a mixture of lauric diethanolamide and a polyethylene oxide condensate of octylphenol) and 90 parts by volume of benzene to obtain a solution which contains 5% w./v. of active ingredient.

A similar composition may be prepared using toluene in place of benzene.

We claim:

1. A fungicidal composition comprising an inert fungicidal adjuvant as a carrier and as the active fungicidal ingredient at least one organic isothiocyanate of a formula selected from the group consisting of

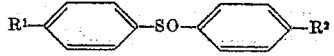

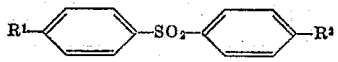

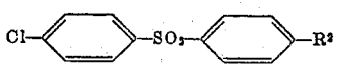

and

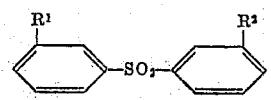

wherein $R^1$ and $R^2$ each represent an isothiocyanato radical.

2. A fungicidal composition comprising an inert fungicidal adjuvant as a carrier and as the active fungicidal ingredient at least one organic isothiocyanate selected from the group consisting of di-4-isothiocyanatophenyl sulphoxide
4-chlorophenyl-4-isothiocyanatophenyl sulphone
di-3-isothiocyanatophenyl sulphone
di-4-isothiocyanatophenyl sulphone.

3. A fungicidal composition according to claim 1 in which said carrier is a pulverulent solid diluent.

4. A fungicidal composition according to claim 1 containing a dispersing agent.

5. A fungicidal composition according to claim 4 containing a water miscible organic solvent.

6. A fungicidal composition according to claim 1 containing a dispersing agent, an emulsifying agent, a non-volatile oil and water.

7. A fungicidal composition according to claim 1 containing an emulsifying agent and an organic solvent.

8. A fungicidal composition according to claim 7 containing a wetting agent.

9. A fungicidal composition according to claim 1 in which said active ingredient is dissolved in an organic solvent.

10. A fungicidal composition according to claim 9 in which said solvent is a low boiling organic solvent.

11. A fungicidal composition according to claim 9 in which said solvent is a high boiling organic solvent.

12. A fungicidal composition according to claim 9 in which said solvent is a mixture of low and high boiling solvents.

13. A fungicidal composition according to claim 9 containing a volatile propellant.

14. A fungicidal composition according to claim 1 which contains an ignitible slow burning composition so that smoke containing the active ingredient is generated upon ignition of the composition.

15. A method of controlling fungi on vegetation which comprises treating the vegetation with a fungicidal composition containing as an active fungicidal ingredient at least one organic isothiocyanate compound of a formula selected from the group consisting of

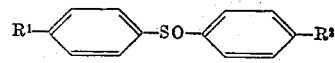

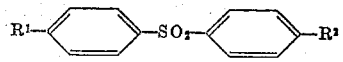

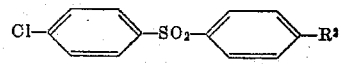

and

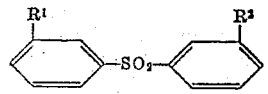

wherein $R^1$ and $R^2$ each represent an isothiocyanato radical.

References Cited in the file of this patent

UNITED STATES PATENTS

| Number | Name | Date |
|---|---|---|
| 2,339,050 | Carson | Jan. 11, 1944 |
| 2,370,405 | Kaase | Feb. 27, 1945 |
| 2,428,843 | Georges | Oct. 14, 1947 |
| 2,749,268 | Newcomer | June 5, 1956 |
| 2,785,101 | Urbschat | Mar. 12, 1957 |
| 2,785,190 | Klopping | Mar. 12, 1957 |

FOREIGN PATENTS

| Number | Country | Date |
|---|---|---|
| 481,733 | Great Britain | Mar. 11, 1938 |